United States Patent
Chang et al.

(10) Patent No.: US 9,770,798 B2
(45) Date of Patent: Sep. 26, 2017

(54) MECHANISM FOR POSITIONING A WORKPIECE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Hsiu-Lung Chang, New Taipei (TW); Zhao Yang, Shenzhen (CN); Ke Hu, Shenzhen (CN); Feng Chen, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/725,162

(22) Filed: May 29, 2015

(65) Prior Publication Data

US 2016/0136767 A1    May 19, 2016

(30) Foreign Application Priority Data

Nov. 17, 2014    (CN) .......................... 2014 1 0652017

(51) Int. Cl.
```
B25B 27/14      (2006.01)
B23Q 3/18       (2006.01)
B23P 15/28      (2006.01)
B23P 15/00      (2006.01)
B23P 19/04      (2006.01)
```
(52) U.S. Cl.
CPC ................ *B23Q 3/18* (2013.01); *B23P 15/00* (2013.01); *B23P 15/28* (2013.01); *B23P 19/04* (2013.01)

(58) Field of Classification Search
USPC .......................................................... 29/271
See application file for complete search history.

(56) References Cited

U.S. PATENT DOCUMENTS

| | | | | |
|---|---|---|---|---|
| 3,906,996 A | * | 9/1975 | DePass ................. | A61M 16/12 128/205.11 |
| 4,787,161 A | * | 11/1988 | Feng ..................... | B43K 29/007 40/334 |
| 5,098,437 A | * | 3/1992 | Kashuba ................ | A61F 2/34 606/89 |
| 5,591,186 A | * | 1/1997 | Wurster ............. | A61B 17/3417 604/164.12 |
| 5,921,839 A | * | 7/1999 | Siren .................... | B43M 99/003 40/358 |

(Continued)

FOREIGN PATENT DOCUMENTS

| CN | 1933936 A | 3/2007 |
|---|---|---|
| CN | 202147253 U | 2/2012 |

(Continued)

*Primary Examiner* — Larry E Waggle, Jr.
*Assistant Examiner* — Alvin Grant
(74) *Attorney, Agent, or Firm* — Steven Reiss

(57) ABSTRACT

A mechanism, configured for positioning a work piece, includes a support member and a position assembly. The position assembly includes a guiding member and a positioning sleeve sleeved on the guiding member. The guiding member detachably is coupled to the support member. The positioning sleeve is detachably coupled to the support member. The guiding member is partially exposed from the positioning sleeve.

20 Claims, 4 Drawing Sheets

(56) References Cited

U.S. PATENT DOCUMENTS

| | | | | |
|---|---|---|---|---|
| 6,436,119 | B1* | 8/2002 | Erb | A61B 17/3417 606/185 |
| 7,927,376 | B2* | 4/2011 | Leisinger | A61F 2/4637 606/91 |
| 8,177,844 | B2* | 5/2012 | Tsuang | A61F 2/4611 606/86 A |
| 8,282,648 | B2* | 10/2012 | Tekulve | A61B 17/8811 604/164.11 |
| 8,357,193 | B2* | 1/2013 | Phan | A61B 17/1114 600/101 |
| 8,360,969 | B2* | 1/2013 | Hanypsiak | A61B 17/3421 600/184 |
| 9,119,948 | B2* | 9/2015 | Lee | A61B 17/12 |
| 9,345,460 | B2* | 5/2016 | Houser | A61B 17/0057 |
| 2004/0251279 | A1* | 12/2004 | Heitlinger | B65B 3/32 222/309 |
| 2008/0179105 | A1* | 7/2008 | Duncan | B23B 51/0426 175/420.1 |

FOREIGN PATENT DOCUMENTS

| | | |
|---|---|---|
| CN | 102678711 A | 9/2012 |
| TW | I378016 B1 | 12/2012 |

* cited by examiner

MECHANISM FOR POSITIONING A WORKPIECE

FIELD

The subject matter herein generally relates to mechanisms for positioning a workpiece, and particularly to a mechanism configured to position a workpiece having a hole.

BACKGROUND

When in machining or other processes, a workpiece usually needs to be positioned. For example, when a workpiece needs to be measured, the workpiece can be positioned on a fixture before measuring.

BRIEF DESCRIPTION OF THE DRAWINGS

Implementations of the present technology will now be described, by way of example only, with reference to the attached figures.

DETAILED DESCRIPTION

Figure 1:
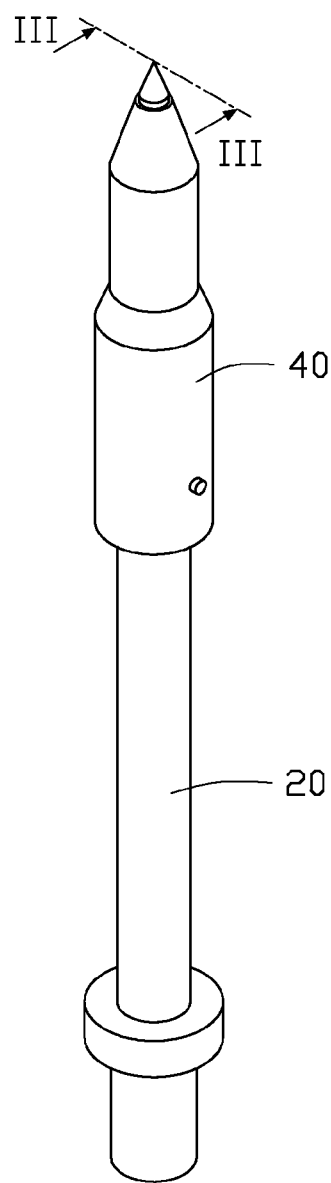
FIG. 1 is an isometric view of an embodiment of a mechanism for positioning a work piece.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to a mechanism for positioning a work piece can include a support member and a position assembly. The position assembly can include a guiding member and a positioning sleeve sleeved on the guiding member. The guiding member can be detachably coupled to the support member. The positioning sleeve can be detachably coupled to the support member. The guiding member can be partially exposed from the positioning sleeve.

The present disclosure is in relation to a mechanism for positioning a work piece can include a support member and a position assembly. The support member can include a main body and a mounting portion coupled to the main body. The mounting portion axially defines a mounting hole. The position assembly can include a guiding member and a positioning sleeve. The guiding member is detachably coupled to the mounting hole of the mounting portion. The positioning sleeve is sleeved on the guiding member and detachably coupled to the support member. The guiding member is partially exposed from the positioning sleeve.

FIG. 1 illustrates an isometric view of an embodiment of a mechanism 100 for positioning a workpiece. The mechanism 100 can be inserted into a hole of a workpiece to position the workpiece. Such as, when a workpiece needs to be positioned for a check, the mechanism 100 can be used in a check fixture to position the workpiece. The mechanism 100 can include a support member 20 and a position assembly 40 detachably coupled to an end of the support member 20.

Figure 2:
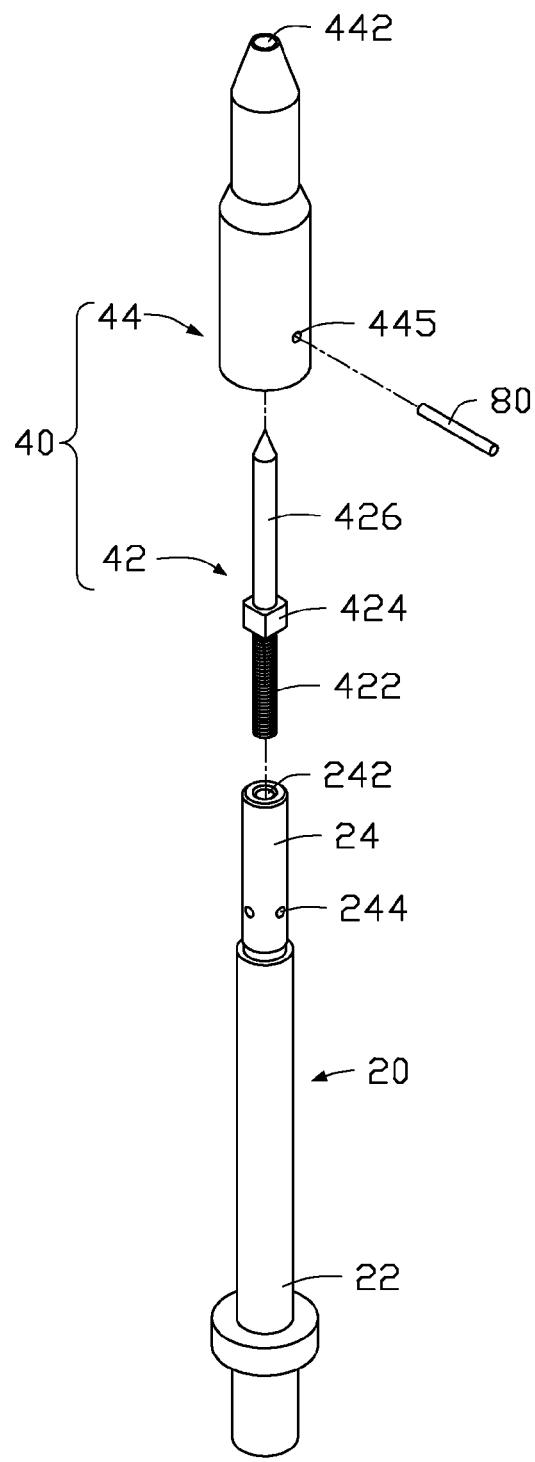
FIG. 2 is an exploded, isometric view of the mechanism of FIG. 1.

FIG. 2 illustrates that the support member 20 can be substantially columnar and can include a main body 22 and a mounting portion 24 coaxial with the main body 22. The main body 22 can be configured to couple a periphery device when in use, such as a check fixture. The mounting portion 24 can be coupled to the main body 22 and can axially define a mounting hole 242. The mounting hole 242 can axially arranged and run through an end surface of mounting portion 24. The mounting portion 24 can include an inner thread 245 (shown in FIG. 3) received in the mounting hole 242. The mounting portion 24 can radially define two inserting holes 244. The inserting holes 244 can run through an outer sidewall of the mounting portion 24. In the illustrated embodiment, one of the inserting holes 244 can be substantially perpendicular to another one of the inserting holes 244. The inserting holes 244 can be adjacent to the main body 22.

The position assembly 40 can be detachably coupled to the mounting portion 24 of the support member 20. The position assembly 40 can include a guiding member 42 and a positioning sleeve 44. The guiding member 42 can be detachably coupled to the mounting portion 24. The guiding member 42 can include a thread rod 422, a limiting block 424 coupled to the thread rod 422, and a pin 426 coupled to the limiting block 424. The limiting block 424 can be positioned between the thread rod 422 and the pin 426.

The thread rod 422 can be detachably threaded with the inner thread 245 of the mounting portion 24, which enable the thread rod 422 to be received in the mounting hole 242. When the guiding member 42 rotates, the guiding member 42 can axially telescope relative to the mounting portion 24. The limiting block 424 can be substantially cuboid and positioned at a distal end of the thread rod 422. A width of the limiting block 424 can be larger than a diameter of the thread rod 422. Thus, the guiding member 42 can be threaded into the mounting hole 242 until the limiting block 424 abutting against the mounting portion 24. The pin 426 can be sharpened for easily inserting into a hole of a workpiece. In the illustrated embodiment, the guiding member 24 can be made of plastic to prevent damage to the workpiece during positioning. In an alternative embodiment, the guiding member 42 can be made of other materials, such as ceramic.

Figure 3:
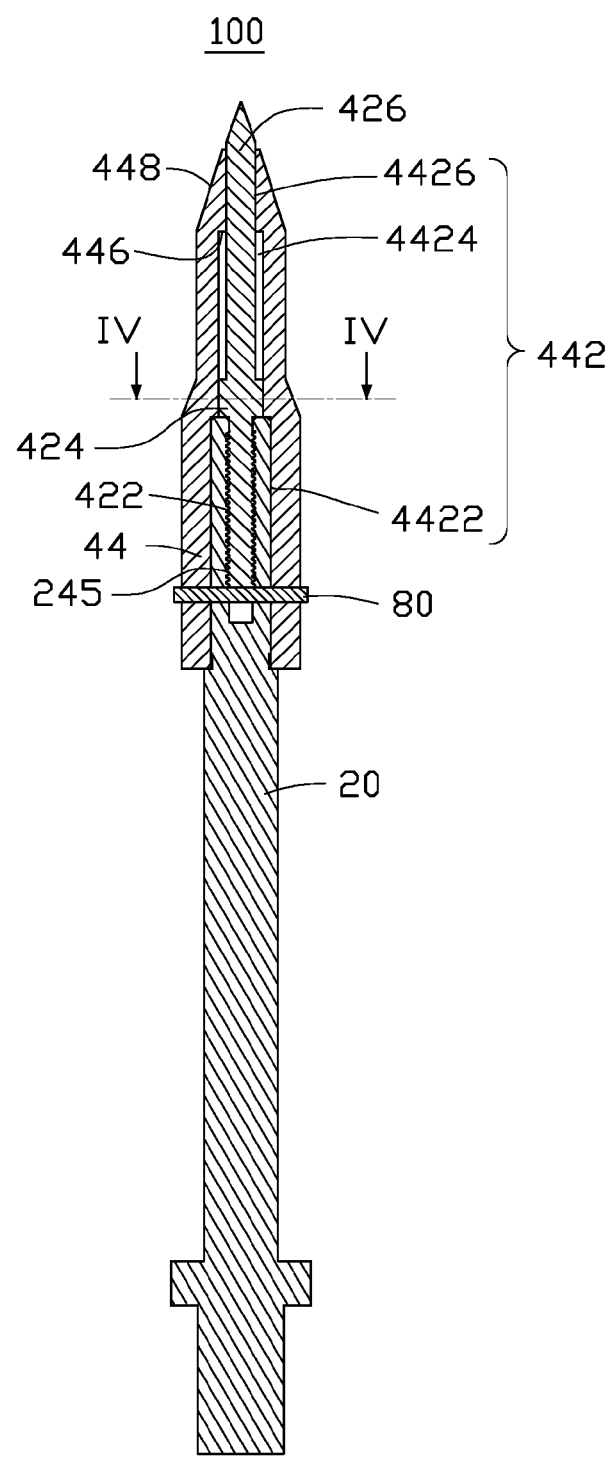
FIG. 3 is a cross-sectional view of the mechanism of FIG. 1, taken along line III-III.

FIG. 3 illustrates that the positioning sleeve 44 can be sleeved on the mounting portion 24 and the guiding member 42, and detachably coupled to the mounting portion 24. The positioning sleeve 44 can axially define a receiving hole 442. The guiding member 42 and the mounting portion 24 can be received in the receiving hole 442. The receiving hole 442 can include a first receiving portion 4422, a second receiving portion 4424 communication with the first receiving portion 4422, and a third receiving portion 4426 communication with the second receiving portion 4424. The second receiving portion 4424 can be positioned between the first receiving portion 4422 and the third receiving portion 4426. The first receiving portion 4422 can be adjacent to the support member 20.

The first receiving portion 4422 can be substantially columnar. The mounting portion 24 can be detachably received in the first receiving portion 4422. The positioning sleeve 44 can radially define a through hole 445 corresponding to either one of the inserting holes 244. A fastener 80 can be alternatively inserted into one of the inserting holes 244 and the through hole 445, thereby detachably assembling the positioning sleeve 44 with the support member 20. Therefore, the positioning sleeve 44 can be non-rotatable relative to the support member 20 during positioning a workpiece.

The second receiving portion 4424 and the third receiving portion 4426 can be sleeved on the guiding member 42. The pin 426 of the guiding member 42 can be partially exposed from the positioning sleeve 44. The guiding member 42 can axially move along the second receiving portion 4424 and the third receiving portion 4426. Thus, an exposing length of the guiding member 42 exposing from the positioning sleeve 44 can be adjusted.

A diameter of the third receiving portion 4426 can be smaller than a diameter of the second receiving portion 4424. Therefore, a restriction portion 446 can be formed between the second receiving portion 4424 and the third receiving portion 4426. The restriction portion 446 can be configured to restrict the exposing length of the guiding member 42 exposing from the positioning sleeve 44.

Figure 4:
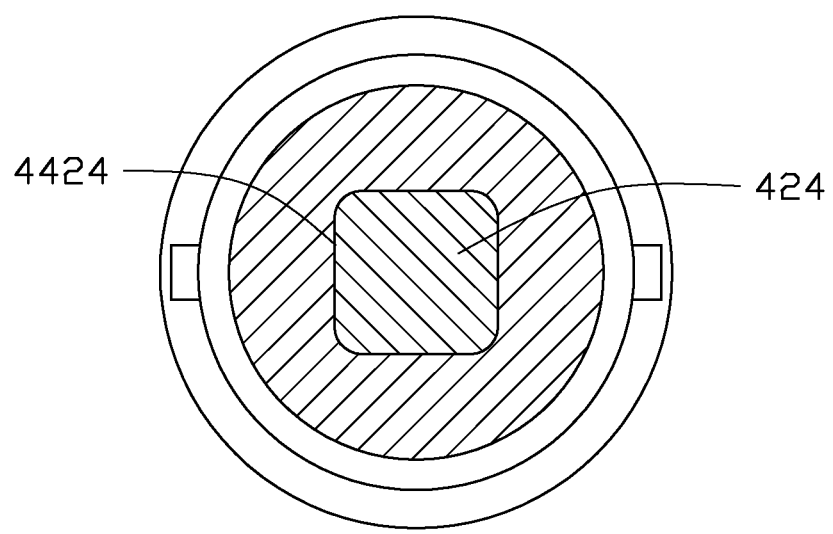
FIG. 4 is a cross-sectional view of the mechanism of FIG. 3, taken along line IV-IV.

FIG. 4 illustrates that the second receiving portion 4424 can be substantially a cuboid hole. A sectional size of the second receiving portion 4424 can match a sectional size of the limiting block 424. A height of the second receiving portion 4424 can be larger than a height of the limiting block 424. When the pin 80 is pulled out and the positioning sleeve 44 rotates, the guiding member 42 can rotate following a rotation of the positioning sleeve 44 and move along the receiving hole 442, to adjust the exposing length of the guiding member 42. The limiting block 424 can move along the second receiving portion 4424 until abutting against the restriction portion 446. In an alternative embodiment, the positioning sleeve 44 can be removed temporarily to rotate the guiding member 42 directly.

A distal end of the positioning sleeve 44 and a distal end of the pin 426 can be inserted into a hole of a workpiece to position the workpiece. The positioning sleeve 44 can have a conical surface 448 at the distal end. In the illustrated embodiment, the positioning sleeve 44 can be made of ceramic to be durable. In an alternative embodiment, the positioning sleeve 44 can be made of other materials, such as iron, steel, plastic.

In assembly, the guiding member 42 can be threaded on the mounting portion 24 of the support member 20. The positioning sleeve 44 can be sleeved on the guiding member 42 and the mounting portion 24. The fastener 80 can detachably couple the support member 20 and the positioning sleeve 44.

When in use, the main body 22 of the support member 20 can be coupled to a check fixture. A workpiece can be put on the check fixture and the position assembly 40 can be inserted into a hole of the workpiece to position the workpiece. During positioning the workpiece, the pin 426 can be inserted into the hole of the workpiece first, and then the positioning sleeve 44 can be inserted into the hole of the workpiece.

When the pin 4426 is damaged or worn, the positioning sleeve 44 can be rotated after removing the fastener 80. Thus, the guiding member 42 can telescope and extend from the positioning sleeve 44. Then, the fastener 80 can be assembled to the positioning sleeve 44 again.

In an alternative embodiment, the positioning sleeve 44 can be detachably coupled to the support member 20 in other structures, such as the positioning sleeve 44 can be threaded with the support member 20. The mounting hole 242 with the inner thread 245 can be formed at the guiding member 42, and the thread rod 422 can be formed on the support member 20.

The embodiments shown and described above are only examples. Many details are often found in the art such as the other features of a mechanism for positioning a work piece. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A mechanism for positioning a workpiece, the mechanism comprising:
   a support member, the support member defining a mounting hole; and
   a position assembly comprising:
      a guiding member comprising a threaded rod detachably coupled to the mounting hole of the support member and a limiting block coupled to the threaded rod, and
      a positioning sleeve sleeved on the threaded rod and the limiting block and detachably coupled to the support member;
   wherein, a width of the limiting block is larger than a diameter of the threaded rod, and the guiding member is partially exposed from the positioning sleeve.

2. The mechanism of claim 1, wherein the guiding member is threaded with the support member to adjust an exposing length of the guiding member exposing from the positioning sleeve.

3. The mechanism of claim 2, wherein the support member has an inner thread received in the mounting hole, the threaded rod is threaded with the inner thread.

4. The mechanism of claim 3, wherein the guiding member further comprises:
   a pin coupled to the limiting block and partially exposed from the positioning sleeve.

5. The mechanism of claim 4, wherein the positioning sleeve axially defines a receiving hole, the receiving hole comprises a first receiving portion, a second receiving portion in communication with the first receiving portion, and a third receiving portion in communication with the second receiving portion, the support member is received in the first receiving portion, the guiding member is received in the second receiving portion and the third receiving portion, the pin is partially exposed from the third receiving portion.

6. The mechanism of claim 5, wherein a diameter of the third receiving portion is smaller than a diameter of the second receiving portion, a restriction portion is formed between the second receiving portion and the third receiving portion, the restriction portion is configured to restrict the exposing length of the guiding member exposing from the positioning sleeve.

7. The mechanism of claim 6, wherein the limiting block is substantially cuboid, the second receiving portion is substantially a cuboid hole, a sectional size of the second receiving portion matches a sectional size of the limiting block, a height of the second receiving portion is larger than a height of the limiting block, the limiting block is configured to slide along the second receiving portion.

8. The mechanism of claim 1, wherein a fastener is detachably coupled to the positioning sleeve and the support member.

9. The mechanism of claim 1, wherein the positioning sleeve is made of ceramic.

10. The mechanism of claim 1, wherein the guiding member is made of plastic.

11. The mechanism of claim 1, wherein the positioning sleeve has a conical surface at a distal end.

12. A mechanism for positioning a work piece, the mechanism comprising:
   a support member comprising:
      a main body, and
      a mounting portion coupled to the main body, the mounting portion axially defining a mounting hole; and
   a position assembly comprising:
      a guiding member comprising a threaded rod detachably coupled to the mounting hole of the mounting portion and a limiting block coupled to the threaded rod, and
      a positioning sleeve sleeved on the threaded rod and the limiting block and detachably coupled to the support member;
   wherein, a width of the limiting block is larger than a diameter of the threaded rod, and the guiding member is partially exposed from the positioning sleeve.

13. The mechanism of claim 12, wherein the mounting portion has an inner thread received in the mounting hole, the threaded rod is detachably threaded with the inner thread of the mounting hole.

14. The mechanism of claim 13, wherein the guiding member further comprises:
   a pin coupled to the limiting block and partially exposed from the positioning sleeve.

15. The mechanism of claim 14, wherein the positioning sleeve axially defines a receiving hole, the receiving hole comprises a first receiving portion, a second receiving portion in communication with the first receiving portion, and a third receiving portion in communication with the second receiving portion, the mounting portion is received in the first receiving portion, the guiding member is received in the second receiving portion and the third receiving portion, the pin is partially exposed from the third receiving portion.

16. The mechanism of claim 15, wherein a diameter of the third receiving portion is smaller than a diameter of the second receiving portion, a restriction portion is formed between the second receiving portion and the third receiving portion, the restriction portion is configured to restrict an exposing length of the guiding member exposing from the positioning sleeve.

17. The mechanism of claim 16, wherein the limiting block is received in the second receiving portion, a sectional size of the second receiving portion matches a sectional size of the limiting block, a height of the second receiving portion is larger than a height of the limiting block, the limiting block is configured to slide along the second receiving portion.

18. The mechanism of claim 12, wherein the mounting portion radially defines an inserting hole, the positioning sleeve radially defines a through hole corresponding to the inserting hole, a fastener is detachably inserted into the through hole and the inserting hole.

19. The mechanism of claim 12, wherein the mounting portion radially defines two inserting holes, the positioning sleeve radially defines a through hole, a fastener is detachably inserted into one of the inserting holes and the through hole.

20. The mechanism of claim 12, wherein the positioning sleeve has a conical surface at a distal end.

* * * * *